(12) United States Patent
Nagai et al.

(10) Patent No.: US 8,986,570 B2
(45) Date of Patent: Mar. 24, 2015

(54) POSITIVE ELECTRODE ACTIVE MATERIAL FOR LITHIUM SECONDARY BATTERY AND USE THEREOF

(75) Inventors: Hiroki Nagai, Nagoya (JP); Hidekazu Hiratsuka, Moriguchi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 194 days.

(21) Appl. No.: 13/514,624
(22) PCT Filed: Dec. 14, 2009
(86) PCT No.: PCT/JP2009/070850
§ 371 (c)(1),
(2), (4) Date: Jun. 8, 2012
(87) PCT Pub. No.: WO2011/074058
PCT Pub. Date: Jun. 23, 2011

(65) Prior Publication Data
US 2012/0248388 A1    Oct. 4, 2012

(51) Int. Cl.
*H01M 4/88* (2006.01)
*H01M 4/505* (2010.01)
*H01M 4/525* (2010.01)

(52) U.S. Cl.
CPC .............. *H01M 4/505* (2013.01); *H01M 4/525* (2013.01); *Y02E 60/122* (2013.01)
USPC ................... 252/182.1; 252/519.1; 252/519.5; 429/94; 429/209; 429/223; 429/231.1; 429/332

(58) Field of Classification Search
CPC .......... H01M 4/139; H01M 2004/028; H01M 4/131; H01M 4/505; H01M 4/525
USPC ......... 252/182.1, 519.15, 519.1; 429/94, 223, 429/332, 231.1, 209
See application file for complete search history.

(56) References Cited

U.S. PATENT DOCUMENTS

| | | | |
|---|---|---|---|
| 2003/0054251 A1 * | 3/2003 | Ohzuku et al. | 429/231.1 |
| 2003/0205700 A1 * | 11/2003 | Gao et al. | 252/500 |
| 2004/0234857 A1 | 11/2004 | Shiozaki et al. | |
| 2005/0220700 A1 | 10/2005 | Suhara et al. | |
| 2007/0212607 A1 | 9/2007 | Fujihara et al. | |
| 2008/0206628 A1 * | 8/2008 | Honbou | 429/94 |
| 2009/0098278 A1 * | 4/2009 | Suh et al. | 427/58 |
| 2010/0136393 A1 | 6/2010 | Takezawa et al. | |

FOREIGN PATENT DOCUMENTS

| | | | |
|---|---|---|---|
| CN | 1701451 | 11/2005 | |
| JP | 2000-323143 | * 11/2000 | H01M 4/58 |
| JP | 2003-17050 | 1/2003 | |
| JP | 2003-068298 | * 3/2003 | H01M 4/58 |
| JP | 2005-196992 | 7/2005 | |
| JP | 2006-107845 | 4/2006 | |
| JP | 2007-242288 | 9/2007 | |
| JP | 2007-273448 | 10/2007 | |
| JP | 2008-234926 | 10/2008 | |
| JP | 2009-54577 | 3/2009 | |
| JP | 2009-140787 | * 6/2009 | H01M 4/52 |
| KR | 10-2005-0044771 | 5/2005 | |
| WO | WO 03/003489 A1 | 1/2003 | |
| WO | WO 03/044881 A1 | 5/2003 | |

OTHER PUBLICATIONS

International Search Report in International Application No. PCT/JP2009/070850; Mailing Date: Jan. 26, 2010.

* cited by examiner

*Primary Examiner* — Khanh Tuan Nguyen
(74) *Attorney, Agent, or Firm* — Finnegan, Henderson, Farabow, Garrett & Dunner, LLP (57) ABSTRACT

The present invention discloses a method for producing a positive electrode active material for a lithium secondary battery constituted by a lithium-nickel-cobalt-manganese complex oxide with a lamellar structure, the method including: (1) a step of preparing a starting source material for producing the complex oxide including a lithium supply source, a nickel supply source, a cobalt supply source, and a manganese supply source; (2) a step of pre-firing the starting source material by heating at a pre-firing temperature that has been set to a temperature lower than 800° C. and higher than a melting temperature of the lithium supply source; and (3) a step of firing the pre-fired material obtained in the pre-firing step by raising a temperature to a temperature range higher than the pre-firing temperature.

4 Claims, 5 Drawing Sheets

POSITIVE ELECTRODE ACTIVE MATERIAL FOR LITHIUM SECONDARY BATTERY AND USE THEREOF

CROSS-REFERENCE TO RELATED APPLICATIONS

This application is a national phase application of International Application No. PCT/JP2009/070850, filed Dec. 14, 2009, the content of which is incorporated herein by reference.

TECHNICAL FIELD

The present invention relates to a positive electrode active material for use in a lithium secondary battery. More specifically, the present invention relates to a positive electrode active material constituted by a lithium complex oxide and a method for producing same. The present invention also relates to a lithium secondary battery provided with a positive electrode material having the aforementioned positive electrode active material and use thereof.

BACKGROUND ART

Secondary batteries such as lithium secondary batteries (typically, lithium ion batteries) and nickel hydride batteries have recently gained importance as power sources for vehicles that use electricity as a drive source or power sources installed on personal computers, portable terminals, or other electric products. In particular, lightweight lithium secondary batteries that make it possible to obtain a high energy density are expected to be advantageously used as high-output power sources for vehicles.

A lithium secondary battery is provided with electrodes of a configuration in which a material (electrode active material) capable of reversibly adsorbing and releasing lithium ions as charge carriers is held at a conductive member (electrode collector), and electrode active materials that make it possible to obtain a higher energy density and a higher output have been investigated. For example, lithium complex oxides such as lithium-cobalt complex oxide ($LiCoO_2$), lithium-nickel complex oxide ($LiNiO_2$), and lithium-manganese complex oxide ($LiMn_2O_4$), which have a lamellar rock salt structure, are known as positive electrode active materials constituting positive electrodes of lithium secondary batteries. Further, lithium-nickel-cobalt-manganese complex oxides in which atoms of nickel, cobalt, and manganese are disposed at metal sites other than those of lithium in the above-mentioned crystal structure have attracted attention as materials that excel in thermal stability and have a high energy density.

In a typical method for synthesizing the abovementioned lithium-nickel-cobalt-manganese complex oxides, powdered compounds serving as source materials are weighed to obtain the predetermined composition and mixed, and the mixture (that is, a starting source material) is fired. A synthesis method disclosed in Patent Literature 1 is an example of the conventional technique relating to such lithium-nickel-cobalt-manganese complex oxides. In this method the mixture of source materials (starting source material) is fired at a temperature of 500° C., and the temperature is then raised to 700° C. to 1000° C. for firing. Further, Patent Literature 2 discloses a method for synthesizing a lithium-nickel-cobalt-manganese complex oxide that is imparted with excellent output-recovery characteristic by adding Zr and Nb as other metal elements, which are different from lithium, nickel, cobalt, and manganese.

CITATION LIST

Patent Literature

Patent Literature 1: Japanese Patent Application Publication No. 2006-107845
Patent Literature 2: Japanese Patent Application Publication No. 2007-273448

SUMMARY OF INVENTION

However, although lithium-nickel-cobalt-manganese complex oxides demonstrate excellent battery characteristics (battery capacity, cycle characteristic, or high-rate characteristic) as positive electrode active materials having a lamellar rock salt structure when the ratio of lithium ions (Li occupancy) is high (rich), technological research of methods for synthesizing lithium-nickel-cobalt-manganese complex oxides with increased Li occupancy is still insufficient. For example, there is space for research relating to molar composition ratio of lithium and other metal elements and the content ratio of components in the entire composition. In particular, in compounds with a comparatively high molar composition ratio of nickel (Ni), from among the compounds included in lithium-nickel-cobalt-manganese complex oxides, the occurrence of diffusion of lithium ions in solid is impeded and it is desirable to increase the Li occupancy.

The present invention has been created with consideration for the present state of development of positive electrode active materials for lithium secondary batteries that are constituted by lithium-nickel-cobalt-manganese complex oxides, and it is an object of the present invention to provide a lithium-nickel-cobalt-manganese complex oxide that has an excellent battery characteristic (battery capacity, cycle characteristic, or high-rate characteristic) and can be advantageously used as a positive electrode active material for a lithium secondary battery, and also a method for producing such a lithium-nickel-cobalt-manganese complex oxide. Another object of the present invention is to provide a positive electrode active material for a lithium secondary battery that includes such a lithium-nickel-cobalt-manganese complex oxide as the main component, and also a method for producing such a positive electrode active material. Yet another object of the present invention is to provide a positive electrode for a lithium secondary battery that is provided with the positive electrode active material having such a lithium-nickel-cobalt-manganese complex oxide as the main component, and also a lithium secondary battery provided with such a positive electrode.

The present invention provides a method for producing a positive electrode active material for a lithium secondary battery. Thus, the production method in accordance with the present invention is a method for producing a positive electrode active material for a lithium secondary battery that is constituted by a lithium-nickel-cobalt-manganese complex oxide with a lamellar structure that has lithium (Li), nickel (Ni), cobalt (Co), and manganese (Mn) as the necessary constituent elements.

More specifically the method for producing a positive electrode active material disclosed herein includes:
(1) a step of preparing a starting source material for producing the complex oxide including a lithium supply source, a nickel supply source, a cobalt supply source, and a manganese supply source; (2) a step of pre-firing the starting source material by heating at a pre-firing temperature that has been set to a temperature lower than 800° C. and higher than a melting temperature of the lithium supply source; and (3) a step (non-pre-firing step) of firing the pre-fired material obtained in the pre-firing step by raising a temperature to a temperature range higher than the pre-firing temperature.

The "lithium secondary battery" as referred to in the present specification means a secondary battery which uses lithium ions as electrolyte ions and in which charging and discharging is realized by the movement of charges with lithium ions between the positive and negative electrodes. A secondary battery typically called a lithium ion battery is a typical example of batteries included in the scope of the lithium secondary battery in the present specification.

The "positive electrode active material" as referred to in the present specification is an active material on a positive electrode side that can reversibly adsorb and desorb (typically, incorporate and release) chemical species (for example, lithium ions) that are charge carriers in a secondary battery.

The higher is the crystallinity of the lithium-nickel-cobalt-manganese complex oxide, the better is the battery characteristic (for example, battery capacity and charge-discharge characteristic) of the lithium secondary battery using the complex oxide as the positive electrode active material. However, concerning complex oxides including a plurality of other metal elements in addition to lithium (in particular, complex oxide with a high molar composition ratio of nickel), a complex oxide with a dense crystal structure is difficult to produce. Where firing is performed under low-temperature conditions (for example, in a low-temperature range such that is below 700° C.) lithium ions do not demonstrate sufficient diffusion in solid of a crystal, and the Li occupancy (the ratio of Li cites in the crystal occupied by lithium ions) becomes low. As a result, a complex oxide having a lamellar structure with a high crystallinity cannot be produced. Meanwhile, where the firing is performed in a high-temperature range (for example, equal to or higher than 1000° C.), the growth of crystals is abruptly accelerated before the starting source material diffuses uniformly. As a result, a complex oxide having the desired stoichiometric composition is difficult to obtain.

Accordingly, the inventors has discovered that Li occupancy can be increased by pre-firing the above-described starting source material for producing the complex oxide by heating at a pre-firing temperature that has been set to a temperature lower than 800° C. and higher than the melting temperature of the lithium supply source (that is, in a range of temperatures that have been set to be equal to or higher than the melting point of the lithium supply source and such that the starting source material is not entirely sintered) and then firing the pre-fired material obtained in the pre-firing step by raising a temperature to a temperature range not lower than the abovementioned melting temperature.

Thus, the above-described pre-firing melts the lithium supply source and enhances the diffusion of lithium ions in solid at a stage at which the size of crystal grains does not increase. As a result, it is possible to produce a lithium-nickel-cobalt-manganese complex oxide of a lamellar structure having a high Li occupancy (for example, the Li occupancy of Li sites in a crystal determined by the Rietveld analysis is greater than 96.5%) and high crystallinity. Therefore, with the production method in accordance with the present invention, it is possible to provide a lithium secondary battery (and a positive electrode thereof) having excellent battery characteristics (battery capacity, cycle characteristic, and high-rate characteristic).

In the preferred embodiment of the production method disclosed herein, the starting source material is prepared such that a molar ratio ($Li/M_{all}$) of lithium (Li) and a total ($M_{all}$) of all other constituent metal elements is $1 < Li/M_{all} \leq 1.2$ (more preferably, $1.05 \, Li/M_{all} \leq 1.2$).

Where the molar composition ratio ($Li/M_{all}$) of lithium (Li) and a total $M_{all}$ of all other constituent metal elements (in this case, the constituent metal elements include nickel, cobalt, manganese, and a Me element in the below-described Formula (1)) constituting the lithium-nickel-cobalt-manganese complex oxide is above 1 (typically, within a range of 1.05 to 1.2), it is possible to obtain a lithium-nickel-cobalt-manganese complex oxide with a lamellar structure having a high Li occupancy and the desired stoichiometric composition.

In the more preferred embodiment of the production method disclosed herein, the complex oxide is a lithium-nickel-cobalt-manganese complex oxide represented by the following formula:

$$Li_{1+x}Ni_aCo_bMn_cMe_dO_2 \quad (1)$$

(where, x, a, b, c, and d are numbers satisfying all of the following conditions:
$0.05 \leq x \leq 0.2$,
$0.3 \leq a \leq 0.6$,
$0.1 \leq b \leq 0.6$,
$0.1 \leq c \leq 0.5$,
$0 \leq d \leq 0.02$,
$a+b+c+d=1$, Me is not present or is one or two or more elements selected from the group consisting of Mg, Sr, Ti, Zr, V, Nb, Ta, Mo, W, B, and Al), and the starting source materials including a lithium source material, a nickel source material, a cobalt source material, and a manganese source material are prepared at a molar ratio that has been set such that the complex oxide represented by Formula (1) above can be produced by the firing.

In particular, lithium carbonate or lithium hydroxide are preferably used as the lithium supply source.

Where such a lithium supply source is used, when the pre-firing is performed by heating at a temperature that is lower than 800° C. and higher than the melting point of the lithium supply source, the lithium supply source melts and therefore diffusion of lithium ions in solid is further enhanced. As a result, it is possible to produce a high crystallinity lithium-nickel-cobalt-manganese complex oxide with a high Li occupancy and high conductivity.

In Formula (1) above, the molar ratio of the oxygen element (O) to the lithium element is described as 2 for the sake of convenience, but this ratio is not necessarily 2 and certain fluctuations of the molar ratio are allowed. For example, the molar ratio of the oxygen element (O) in Formula (1) can be from 1.8 to 2.2 (more typically, from 1.9 to 2.1).

In another preferred embodiment of the production method provided by the present invention, a hydroxide of a constituent element to be supplied is used as any one species or two or more species from among the nickel supply source, cobalt supply source, and manganese supply source.

Separate compounds such as hydroxides, oxides, various salts (for example, carbonates), and halides (for example, fluorides) of nickel, cobalt, and manganese may be selected and used as the nickel supply source, cobalt supply source, and manganese supply source, but it is more preferred that a hydroxide including any one species or two or more species from among nickel, cobalt, and manganese be used as the supply sources. Such hydroxide may be effectively mixed with the lithium supply source, the diffusion of lithium ions in solid can be enhanced, and a sufficient reaction can proceed.

As a result, it is possible to produce a lithium-nickel-cobalt-manganese complex oxide with a high Li occupancy and the desired stoichiometric composition.

Further, it is preferred that the starting source material be pre-fired at a pre-firing temperature that is set within a temperature range from a temperature equal to or higher than 710° C. to a temperature lower than 800° C. in air or an oxidizing atmosphere and then fired by raising the temperature to a maximum firing temperature that is set within a temperature range from 800° C. to 1000° C.

By performing the pre-firing at the abovementioned temperature and then raising the temperature for firing (main firing), it is possible to reduce the amount of residual alkali components contained in the starting source material. Where an excess amount of alkali components remains in a positive electrode active material, the excessive alkali components may decompose the electrolytic solution in the lithium secondary battery constructed by using the positive electrode active material, thereby causing gas generation or corroding the positive electrode collector. Therefore, from the standpoint of reducing the amount of excessive alkali components, it is preferred that the firing be conducted at the abovementioned temperature.

As another aspect, the present invention also provides a positive electrode active material for a lithium secondary battery. Thus, the positive electrode active material for a lithium secondary battery disclosed herein is constituted substantially by a lithium-nickel-cobalt-manganese complex oxide with a lamellar structure having lithium, nickel, cobalt, and manganese as necessary constituent elements, wherein: the complex oxide is represented by the following formula:

$$Li_{1+x}Ni_aCo_bMn_cMe_dO_2 \qquad (1)$$

(where, x, a, b, c, and d are numbers satisfying all of the following conditions:
 $0.05 \leq x \leq 0.2$,
 $0.3 \leq a \leq 0.6$,
 $0.1 \leq b \leq 0.6$,
 $0.1 \leq c \leq 0.5$,
 $0 \leq d \leq 0.02$,
 $a+b+c+d=1$, Me is not present or is one or two or more elements selected from the group consisting of Mg, Sr, Ti, Zr, V, Nb, Ta, Mo, W, B, and Al), and a Li occupancy of Li sites in a crystal determined in the complex oxide by the Rietveld analysis is greater than 96.5%.

In the preferred embodiment, the positive electrode active material for a lithium secondary battery is produced by any of the production methods disclosed herein.

Where the Li occupancy is low, other atoms (nickel, cobalt, manganese, or Me atoms) are introduced in Li sites. Therefore, the ratio of lithium ions, which are charge carriers, decreases undesirably. However, where a lithium-nickel-cobalt-manganese complex oxide with a Li occupancy higher than 96.5% and high crystallinity is used as the positive electrode active material, the increase in internal resistance of the lithium secondary battery is inhibited and a contribution is made to the improvement of battery characteristics (battery capacity, cycle characteristic, or high-rate characteristic).

The present invention also provides a lithium secondary battery provided with a positive electrode including the positive electrode active material for a lithium secondary battery disclosed herein. The lithium secondary battery in accordance with the present invention uses a lithium-nickel-cobalt-manganese complex oxide of a lamellar structure that has a high Li occupancy and high crystallinity as a positive electrode active material. Therefore, a battery having excellent battery characteristics (battery capacity, cycle characteristic, or high-rate characteristic) can be obtained.

The present invention also provides a vehicle equipped with the lithium secondary battery disclosed herein. The lithium secondary battery provided by the present invention demonstrates battery characteristics suitable for a battery power supply to be installed on a vehicle as described above. Therefore, the lithium secondary battery disclosed herein can be advantageously used as a power source for vehicles such as automobiles equipped with an electric motor, such as hybrid automobiles and electric automobiles.

DESCRIPTION OF EMBODIMENTS

The preferred embodiments of the present invention are described below. The matter necessary for carrying out the present invention, other than that specifically referred to in the present specification, can be construed as a design matter for a person skilled in the art, this matter being based on the conventional techniques in the pertinent field. The present invention can be carried out on the basis of the contents disclosed in the present specification and common technical knowledge in the pertinent field.

The positive electrode active material provided by the present invention is a positive electrode active material for a lithium secondary battery that is constituted by a lithium-nickel-cobalt-manganese complex oxide of a lamellar structure that has lithium (Li), nickel (Ni), cobalt (Co), and manganese (Mn) as necessary metal elements. The positive electrode active material constituted by the abovementioned lithium-nickel-cobalt-manganese complex oxide and a method for producing the active material will be described below in greater detail, but this description is not intended to restrict the present invention to such an embodiment.

Further, the matter (for example, the configuration and production method of the electrode body provided with a positive electrode and a negative electrode, the configuration and production method of the separator and electrolyte, and general techniques relating to the construction of lithium secondary battery and other batteries), necessary for carrying out the present invention, other than that specifically referred to in the present specification, can be construed as a design matter for a person skilled in the art, this matter being based on the conventional techniques in the pertinent field.

In the drawings presented hereinbelow, members and parts demonstrating like effects are denoted by like reference numerals and the redundant explanation thereof is simplified or omitted. The dimensional relationships (length, width, thickness, etc.) in the drawings do not reflect the actual dimensional relationships.

First, the positive electrode active material constituted by the lithium-nickel-cobalt-manganese complex oxide in accordance with the present invention will be explained.

The positive electrode active material disclosed herein is a positive electrode active material for a lithium secondary battery constituted substantially by a lithium-nickel-cobalt-manganese complex oxide of a lamellar structure having lithium, nickel, cobalt, and manganese as the necessary constituent elements, in which:

the complex oxide is represented by the following formula:

$$Li_{1+x}Ni_aCo_bMn_cMe_dO_2 \quad (1)$$

(where, x, a, b, c, and d are numbers satisfying all of the following conditions:

$0.05 \leq x \leq 0.2$,
$0.3 \leq a \leq 0.6$,
$0.1 \leq b \leq 0.6$,
$0.1 \leq c \leq 0.5$,
$0 \leq d \leq 0.02$,
$a+b+c+d=1$, Me is not present or is one or two or more elements selected from the group consisting of Mg, Sr, Ti, Zr, V, Nb, Ta, Mo, W, B, and Al), and a Li occupancy of Li sites in a crystal determined in the complex oxide by the Rietveld analysis is greater than 96.5% (preferably, 97%, for example, 98%).

Where a Li occupancy is high, lithium-nickel-cobalt-manganese complex oxides demonstrate excellent battery characteristics (battery capacity, cycle characteristic, or high-rate characteristic) as positive electrode active materials. In the complex oxide disclosed herein, the Li occupancy of Li sites in a crystal determined by the Rietveld analysis is greater than 96.5%. Where the Li occupancy is low, a state is assumed in which other atoms (nickel, cobalt, manganese, or Me atoms in Formula (1) above) take the Li sites. Therefore, the ratio of lithium ions serving as charge carriers decreases, which is undesirable for a positive electrode active material. However, where a lithium-nickel-cobalt-manganese complex oxide having a Li occupancy greater than 96.5% and high crystallinity is used as the positive electrode active material, the increase in internal resistance of the lithium secondary battery is inhibited and a contribution is made to the improvement of battery characteristics (battery capacity, cycle characteristic, or high-rate characteristic). The Li occupancy as referred to herein is a ratio of Li sites taken by lithium ions in a crystal of a lithium-nickel-cobalt-manganese complex oxide having a lamellar rock salt structure. The Rietveld analysis is used to calculate the Li occupancy. The Rietveld analysis is a method by which various parameters (lattice constant, occupancy of atoms in sites, and the like) of a crystal structure are refined so that the diffraction intensity calculated with the assumed crystal structure model matches the X ray diffraction pattern (diffraction intensity) that has been actually measured by powder X ray diffraction or the like. The Li occupancy disclosed herein can be determined by using as appropriate a technique similar to the conventional well-known Rietveld analysis (method).

A method for producing a positive electrode active material for a lithium secondary battery constituted by a lithium-nickel-cobalt-manganese complex oxide of a lamellar structure having lithium, nickel, cobalt, and manganese as the necessary constituent elements will be explained below.

The production method disclosed herein includes the steps of:

(1) preparing a starting source material for producing the complex oxide including a lithium supply source, a nickel supply source, a cobalt supply source, and a manganese supply source; (2) pre-firing the starting source material by heating at a pre-firing temperature that has been set to a temperature lower than 800° C. and higher than a melting temperature of the lithium supply source; and (3) firing the pre-fired material obtained in the pre-firing step by raising a temperature to a temperature range higher than the pre-firing temperature. This method will be described below in greater detail.

One of the preferred embodiments of the abovementioned lithium-nickel-cobalt-manganese complex oxide is represented by the following formula:

$$Li_{1+x}Ni_aCo_bMn_cMe_dO_2 \quad (1)$$

(where, x, a, b, c, and d are numbers satisfying all of the following conditions:

$0.05 \leq x \leq 0.2$,
$0.3 \leq a \leq 0.6$,
$0.1 \leq b \leq 0.6$,
$0.1 \leq c \leq 0.5$,
$0 \leq d \leq 0.02$,
$a+b+c+d=1$, Me is not present or is one or two or more elements selected from the group consisting of Mg, Sr, Ti, Zr, V, Nb, Ta, Mo, W, B, and Al).

The starting source materials including a lithium supply source, a nickel supply source, a cobalt supply source, and a manganese supply source is prepared by mixing at a molar ratio that has been set such that the complex oxide represented by Formula (1) above could be produced by firing.

<Starting Source Materials>

A lithium supply source, a nickel supply source, a cobalt supply source, and a manganese supply source are prepared as starting source materials for constituting the abovementioned lithium-nickel-cobalt-manganese complex oxide. A compound of one kind or a mixture of compounds of two or more kinds may be used as a supply source of each element. A source material compound (for example, nickel phosphate hydrate or lithium phosphate) that functions as a supply source of elements of two or more kinds can be also used.

For example, a lithium organic acid compound such as lithium acetate and lithium oxalate and a lithium inorganic acid compound such as lithium carbonate, lithium hydroxide, and lithium phosphate may be used as a lithium supply source. The particularly preferred lithium supply sources are lithium carbonate and lithium hydroxide. Where pre-firing is performed by heating at a temperature lower than 800° C. and higher than the melting point of such lithium supply source in the below-described pre-firing step, the above-mentioned lithium supply source is melted and the diffusion of lithium ions in solid is further enhanced. As a result, a lithium-nickel-cobalt-manganese complex oxide with increased Li occupancy can be produced.

Compounds such as hydroxides, oxides, various salts (for example, carbonates), and halides (for example, fluorides) having nickel, cobalt, or manganese as constituent elements can be selected as the nickel supply source, cobalt supply source, and manganese supply source. Examples of suitable compounds, which are not particularly limiting, include nickel carbonate, nickel oxide, nickel sulfate, nickel nitrate, nickel hydroxide, and nickel oxyhydroxide as the nickel supply source (compound), cobalt carbonate, cobalt oxide, cobalt sulfate, cobalt nitrate, cobalt hydroxide, and cobalt oxyhydroxide as the cobalt supply source (compound), and manganese carbonate, manganese oxide, manganese sulfate, manganese nitrate, manganese hydroxide, and manganese oxyhydroxide as the manganese supply source (compound).

It is also preferred that a hydroxide including the constituent elements (nickel, cobalt, and manganese) that should be supplied be used as the aforementioned supply source of any one kind or two or more kinds instead of supplying the nickel supply source, cobalt supply source, and manganese supply source as separate compounds. Such a hydroxide including the constituent elements of two or more kinds can be generated by mixing the compounds at a predetermined molar ratio and reducing the source material compounds under alkali conditions, preferably in a nonoxidizing atmosphere such as an inactive gas atmosphere. Where the hydroxide thus generated is used, effective mixing with the abovementioned lithium supply source is ensured and the diffusion of lithium ions in solid is sufficiently enhanced. As a result, a lithium-nickel-cobalt-manganese complex oxide with a high Li occupancy and the desired stoichiometric composition can be obtained.

The lithium-nickel-cobalt-manganese complex oxide disclosed herein includes nickel, cobalt, and manganese as the main constituent metal elements other than lithium, but one or two or more other metal elements (inclusive of semimetal elements such as boron (B)) that are represented by Me in Formula (1) above and replace some of those necessary metal elements may be included. For example, any element belonging to Group 2 (alkaline earth metals such as magnesium, calcium, and strontium), Group 4 (transition metals such as titanium and zirconium), Group 5 (transition metals such as vanadium, niobium, and tantalum), Group 6 (transition metals such as molybdenum and tungsten), Group 8 (transition metals such as iron), Group 9 (transition metals such as rhodium), Group 10 (transition metals such as palladium and platinum), Group 11 (transition metals such as copper), Group 12 (metals such as zinc), and Group 13 (boron, which is a semi-metallic element, and a metal such as aluminum) of the Periodic Table of the Elements can be used. It is preferred that one or two or more elements (typically, 2 or 3 elements) be selected from among magnesium (Mg), strontium (Sr), titanium (Ti), zirconium (Zr), vanadium (V), niobium (Nb), tantalum (Ta), molybdenum (Mo), tungsten (W), boron (B), and aluminum (Al). The molar composition ratio (a) of the Me element is a number satisfying the condition $0 \leq a \leq 0.02$. Thus, the Me element is not present or is included at a molar ratio less than that of any of the main constituent metal elements (lithium, nickel, cobalt, and manganese). It is especially preferred that a metal element belonging to Group 4 (titanium, zirconium, and the like), Group 5 (vanadium, niobium, and tantalum), or Group 6 (molybdenum, tungsten, and the like), from among the aforementioned elements, be used. By adding those elements at an adequate molar ratio, it is possible to increase the conductivity of the positive electrode active material (and eventually decrease the internal resistance of the battery).

The prepared supply sources of the constituent elements are weighed and mixed to prepare a starting source material. The starting source material is preferably prepared such that the molar ratio (Li/$M_{all}$) of lithium (Li) and a total ($M_{all}$) of all other constituent metal elements is greater than 1. Typically, the starting source material may be prepared such that $1 < Li/M_{all} \leq 1.2$, more preferably $1.05 \leq Li/M_{all} \leq 1.2$.

Preparing the starting source material by adjusting (weighing) the supply sources so as to obtain the molar ratio as in Formula (1) above is one of particularly preferred conditions for producing the lithium-nickel-cobalt-manganese complex oxide disclosed herein. Thus, the supply sources are mixed so that the molar composition ratio (1+x) of lithium is $1.05 \leq 1+x \leq 1.2$, the molar composition ratio (a) of nickel is $0.3 \leq a \leq 0.6$, the molar composition ratio (b) of cobalt is $0.1 \leq b \leq 0.6$, the molar composition ratio (c) of manganese is $0.1 \leq c \leq 0.5$, and the molar composition ratio (d) of the element Me contained in a very small amount is $0 \leq d \leq 0.02$ (however, the condition a+b+c+d=1 is satisfied). Further, another supply sources may be also mixed to obtain an excess of lithium supply source so that the molar ratio (Li/$M_{all}$) of lithium and a total ($M_{all}$) of constituent metal elements (nickel, cobalt, manganese, and the Me element that is added as desired) other than lithium be $1 < Li/M_{all} \leq 1.2$, more preferably $1.05 \leq Li/M_{all} \leq 1.2$ (for example, 1.08 Li/$M_{all} \leq 1.15$). As a result, where the mixture of the supply sources (that is, the starting source material) is pre-fired, the diffusion of lithium ions in solid is enhanced, and subsequent firing makes it possible to obtain a lithium-nickel-cobalt-manganese complex oxide of a lamellar structure with a high Li occupancy.

When the mixture of the supply sources (that is, the starting source material) is prepared, agitation (including kneading and grinding) can be performed as necessary. An apparatus to be used for mixing is not particularly limited, but where, for example, a planetary mixer, a planetary agitation apparatus, a disperser, a ball mill, a kneader, or a mixer is used, uniform diffusion and permeation of the supply sources can be attained and a stable mixing state can be formed.

<Pre-Firing>

The pre-firing is described below. After the supply sources have been mixed and the starting source material has been prepared, the starting source material is pre-fired. The pre-firing is desirably performed in the air or an atmosphere (oxidizing atmosphere) that is richer in oxygen than the air. The pre-firing temperature is set to a temperature lower than 800° C. and higher than a melting temperature of the lithium supply source. It is preferred that the pre-firing be performed within a temperature range from a temperature equal to or higher than 710° C. to a temperature less than 800° C. (typically from 720° C. to 780° C., preferably from about 730° C. to 770° C.). Where the pre-firing is performed by heating in such a temperature range, the diffusion of lithium ions in solid can be enhanced, while inhibiting the abrupt growth of crystals. The diffusion of lithium ions in solid is particularly difficult and the Li occupancy is difficult to increase in compounds with a comparatively high molar composition ratio of nickel, from among the compounds included in the lithium-nickel-cobalt-manganese complex oxides. Therefore, where the heating is maintained at the aforementioned temperature at which the lithium supply source melts, the lithium ions are disposed at Li sited in the crystal and the crystal grows stably. As a result, a positive electrode active material with high crystallinity can be obtained.

The pre-firing time is not particularly limited, but after the temperature has been raised from the room temperature to the abovementioned set temperature range, the pre-firing may be performed by holding the temperature within this range for 1 to about 10 hours (for example, 5 hours).

<Firing>

The pre-fired material obtained in the above-described pre-firing step is fired by further raising the temperature to a temperature range above the pre-firing temperature. It is preferred that the firing be performed by raising the temperature to a maximum firing temperature that is set within a temperature range from 800° C. to 1000° C. For example, where the heating is performed in a temperature range that is higher by 50° C. or more, preferably by 100° C. or more, and even more preferably by 150° C. or more than the pre-firing temperature, the density of the crystal structure of the lithium-nickel-cobalt-manganese complex oxide can be advantageously increased and a positive electrode active material having a high Li occupancy can be produced. Further, the alkali component residue contained in the starting source material can be evaporated and the amount thereof can be reduced. Where an excess amount of alkali components remains, the excess alkali components may decompose the electrolytic solution, thereby generating gas, in a lithium secondary battery constructed by using the positive electrode active material, or the metal constituting the positive electrode collector is corroded and the internal resistance is increased. However, those adverse effects can be avoided by reducing the amount of alkali component residue by firing at a high temperature.

The firing time is not particularly limited, and after the temperature has been raised from the abovementioned pre-firing temperature to the set maximum firing temperature, the firing may be performed by holding the temperature within this temperature range for 1 to about 24 hours (for example, 20 hours).

The lithium-nickel-cobalt-manganese complex oxide obtained by the above-described firing can be in the form of fine particles with an average particle diameter (D50) equal to or less than 20 µm (typically, 1 to 10 µm, for example, 3 to 8 µm). Further, a lithium-nickel-cobalt-manganese complex oxide with a BET specific surface area equal to or less than 2 $m^2/g$ (typically 0.1 to 1.5 $m^2/g$, for example, 0.4 to 1 $m^2/g$) can be obtained. The average particle diameter (D50) is a median diameter based on a volume standard (D50: 50% volume-average particle diameter) and can be measured by a typical commercial particle size meter (particle size distribution measurement apparatus of a laser diffraction type). The BET specific surface area can be measured by a commercial measurement apparatus (for example, a computer-controlled fully automated BET specific surface area measuring device).

If necessary, the lithium-nickel-cobalt-manganese complex oxide may be ground. By grinding, granulating, and classifying the fired material with an appropriate means, it is possible to obtain the powder of a grain-like lithium-nickel-cobalt-manganese complex oxide having the desired average particle diameter and/or BET specific surface area.

The lithium-nickel-cobalt-manganese complex oxide obtained in the above-described manner by the production method of the present embodiment has a high Li occupancy and high crystallinity. Therefore, such a complex oxide can be advantageously used as a constituent element (positive electrode active material) of a positive electrode incorporated in lithium secondary batteries of various forms (typically, a lithium ion battery).

An embodiment of the positive electrode using the lithium-nickel-cobalt-manganese complex oxide obtained by the production method disclosed herein as a positive electrode active material and a lithium secondary battery provided with the positive electrode will be described below with reference to the schematic diagrams shown in FIG. 1 and FIG. 2, but the present invention is not intended to be limited to this embodiment.

Figure 1:
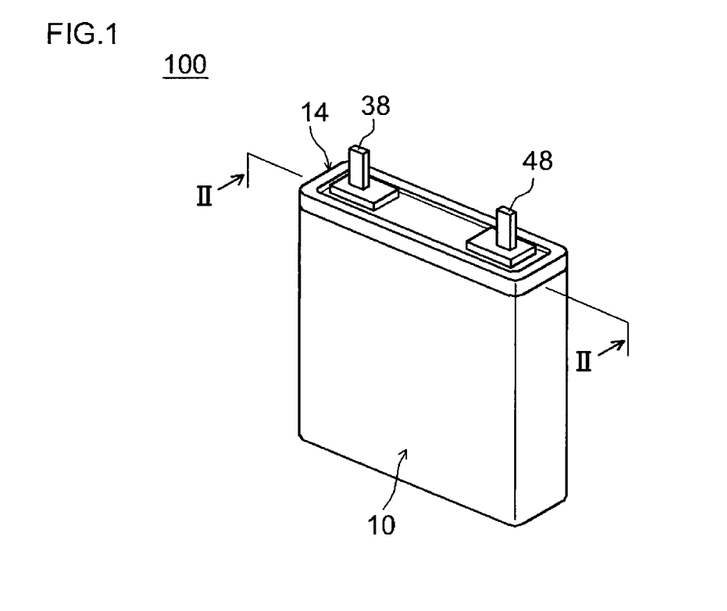
FIG. 1 shows schematically a lithium secondary battery according to one embodiment.

FIG. 1 is a perspective view illustrating schematically a lithium secondary battery of an angular shape of the present embodiment. FIG. 2 is a cross-sectional view taken along the II-II line in FIG. 1. As shown in FIG. 1 and FIG. 2, a lithium secondary battery 100 of the present embodiment includes an angular case 10 in the form of a rectangular parallelepiped and a lid 14 that closes an opening 12 of the case 10. A flat electrode body (wound electrode body 20) and an electrolyte can be accommodated inside the case 10 through the opening 12. The lid 14 is provided with a positive electrode terminal 38 and a negative electrode terminal 48 for external connection, and parts of those terminals 38, 48 protrude to the surface side of the lid 14. Parts of the external terminals 38, 48 are connected inside the case to the internal positive electrode terminal 37 and internal negative electrode terminal 47, respectively.

Figure 2:
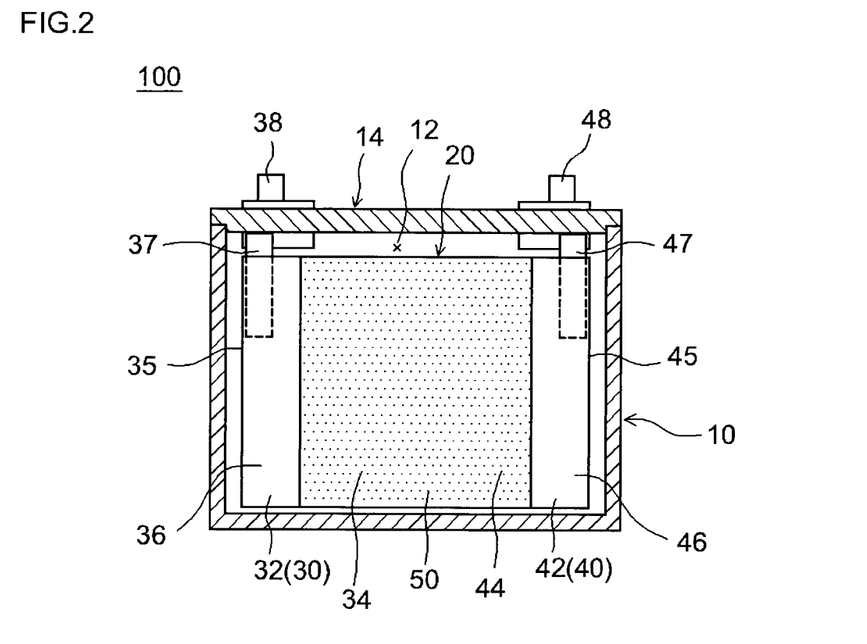
FIG. 2 is a cross-sectional view taken along the II-II line in FIG. 1.

As shown in FIG. 2, in the present embodiment, the wound electrode body 20 is accommodated inside the case 10. The electrode body 20 is constituted by a positive electrode sheet 30 in which a positive electrode active material layer 34 is formed on the surface of an elongated sheet-shaped positive electrode collector 32, a negative electrode sheet 40 in which a negative electrode active material layer 44 is formed on the surface of an elongated sheet-shaped negative electrode collector 42, and an elongated sheet-shaped separator 50. The positive electrode sheet 30 and the negative electrode sheet 40 are laminated together with two separators 50, the laminate is wound, and the obtained wound electrode body 20 is collapsed by compression from the side surface direction to obtain a flat shape.

In the wound positive electrode sheet 30, the positive electrode active material layer 34 is not formed on one end portion 35 along the longitudinal direction of the positive electrode sheet, and a portion with the exposed positive electrode collector 32 is obtained (positive electrode active material layer non-formation portion 36). Likewise, in the wound negative electrode sheet 40, the negative electrode active material layer 44 is not formed on one end portion 46 along the longitudinal direction of the negative electrode sheet, and a portion with the exposed negative electrode collector 42 is obtained (negative electrode active material layer non-formation portion 46). The internal positive electrode terminal 37 is joined to the positive electrode active material layer non-formation portion 36 of the positive electrode collector 32, the internal negative electrode terminal 47 is joined to the exposed end portion of the negative electrode collector 42, and the terminals are electrically connected to the positive electrode sheet 30 and negative electrode sheet 40 of the wound electrode body 20 formed in a flat shape. The positive and negative electrode terminals 37, 47 and the positive and negative electrode collectors 32, 42 can be joined, for example, by ultrasonic welding or resistance welding.

The positive electrode (typically, positive electrode sheet 30) can be of a configuration in which the positive electrode active material layer 34 including the positive electrode active material is formed on the elongated positive electrode collector 32. An aluminum foil or other metal foils suitable for a positive electrode can be advantageously used for the positive electrode collector 32. The lithium-nickel-cobalt-manganese complex oxide obtained using the production method disclosed herein can be used as the positive electrode active material.

In addition to the positive electrode active material, the positive electrode active material layer 34 can include, as necessary, a binder or a conducive material of one or two or more kinds that can be compounded in a typical lithium secondary battery. A conductive powdered material such as carbon powder or carbon fibers can be advantageously used as the conductive material. For example, acetylene black, furnace black, Ketjen black, and graphite powder can be advantageously used, and these powders may be used individually or in combinations of two or more thereof.

The positive electrode active material layer 34 can be fabricated by adding the positive electrode active material, binder, and conductive material to an appropriate solvent (water, an organic solvent, or a mixed solvent thereof), dispersing or dissolving to obtain a paste- or slurry-like composition, coating the composition on the positive electrode collector 32, drying the solvent, and compressing.

Meanwhile, the negative electrode (typically, negative electrode sheet 40) can be of a configuration in which the negative electrode active material layer 44 is formed on the elongated negative electrode collector 42 (for example, a copper foil). One or two or more substances conventionally used for lithium secondary batteries can be used without any particular limitation for the negative electrode active material. As a preferred example, carbon particles can be used. A particulate carbon material (carbon particles) having a graphite structure (lamellar structure) in at least part thereof is preferably used. Carbon materials such as the so-called graphite-like material (graphite), carbonaceous material that is difficult to graphitize (hard carbon), and carbonaceous material that is easy to graphitize (soft carbon), or materials having a structure in which the structures of those material are combined can be also advantageously used.

Further, in addition to the abovementioned negative electrode active material, the negative electrode active material layer 44 can also include, if necessary, a material of one or two or more kinds, such as a binding material, that can be compounded in a typical lithium secondary battery. The negative electrode active material layer can be advantageously fabricated by adding the negative electrode active material, binder, and the like to an appropriate solvent (water, an organic solvent, or a mixed solvent thereof), dispersing or dissolving to obtain a paste- or slurry-like composition, coating the composition on the negative electrode collector 42, drying the solvent, and compressing.

A separator constituted by a porous polyolefin resin is an example of the preferred separator sheet 5 that is used between the positive and negative electrode sheets 30, 40. For example, a synthetic resin porous separator sheet (for example, made from a polyolefin such as polyethylene) can be advantageously used. When a solid electrolyte or a gel electrolyte is used, the separator is sometimes not required (thus, in this case, the electrolyte itself can function as the separator).

An electrolytic solution similar to nonaqueous electrolytic solutions that have been conventionally used in lithium secondary batteries can be used without any particular restriction as the electrolyte. Such a nonaqueous electrolytic solution typically has a composition in which an appropriate nonaqueous solvent includes a support salt. For example, a solvent of one or two or more kinds selected from the group consisting of propylene carbonate (PC), ethylene carbonate (EC), diethyl carbonate (DEC), dimethyl carbonate (DMC), and ethyl methyl carbonate (EMC) can be used as the nonaqueous solvent. Further, for example, a lithium compound (lithium salt) such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, and $LiI$ can be used as the support salt. The concentration of the support salt in the nonaqueous electrolytic solution is not particularly limited and may be same as that in the nonaqueous electrolytic solutions that have been used in the conventional lithium secondary batteries. An electrolyte including the appropriate lithium compound (support salt) at a concentration of about 0.1 to 5 mol/L can be used.

A general sequence of constructing the lithium secondary battery 100 of one embodiment is described below. The lithium secondary battery 100 of the present embodiment can be constructed by laminating the positive electrode sheet 30 and the negative electrode sheet 40 fabricated in the above-described manner together with the two separators 50, winding the laminate, collapsing by compression from the lamination direction to mold the electrode body 20 into a flat shape, accommodating inside the case 10, pouring the electrolyte, attaching the lid 14 to the case opening 12, and sealing. The structure, dimensions, and material (for example, can be produced from a metal or a laminated film) of the battery case 10 are not particularly limited.

The lithium secondary battery 100 constructed in the above-described manner is constructed by using the positive electrode active material constituted by the lithium-nickel-cobalt-manganese complex oxide of a lamellar structure that has, as described hereinabove, a high Li occupancy and high crystallinity. Therefore, the battery can be provided with a high energy density and can demonstrate an excellent battery characteristic (for example, a high-rate characteristic and cycle characteristic).

Figure 3:
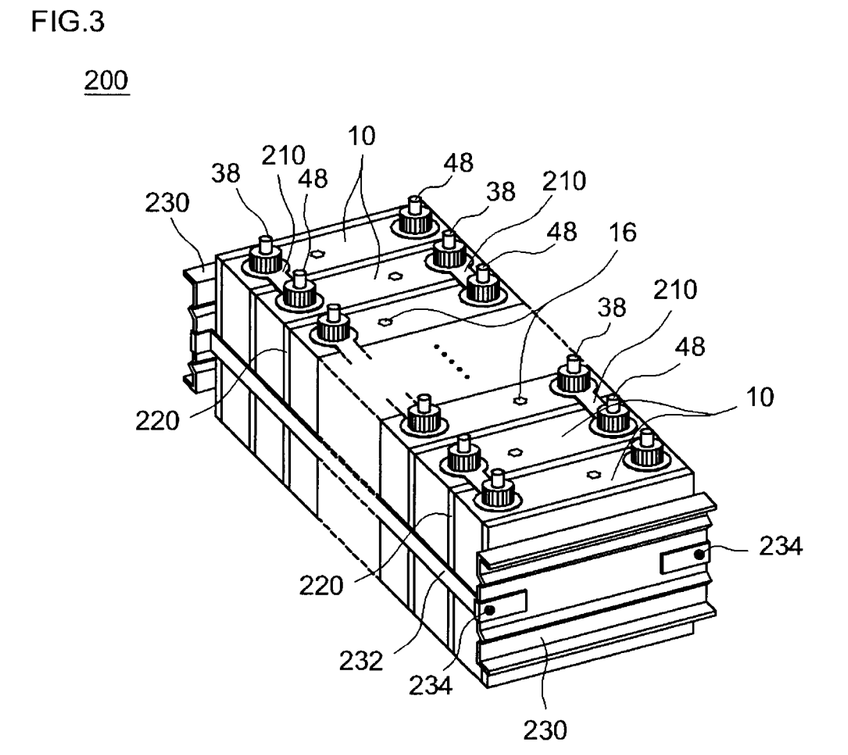
FIG. 3 is a perspective view illustrating schematically the configuration of a battery pack according to one embodiment.

A battery pack 200 constituted by arranging in a row a plurality of lithium batteries 100 of the present embodiment as unit cells is described below. The battery 100 constructed in the above-described manner is used as a unit cell; the explanation below is conducted with reference to the appended drawings.

FIG. 3 is a perspective view illustrating the configuration of the battery pack of one embodiment. As shown in FIG. 3, in the battery pack 200, the unit cells (batteries 100) of the same shape are arranged in series with the same spacing. A positive electrode current collection terminal 38 that is electrically connected to the positive electrode of the electrode body 20 and the negative electrode current collection terminal 48 that is electrically connected to the negative electrode protrude at the surface side of the lid 14 of the unit cell 100. Between the adjacent unit cells 100, the positive electrode current collection terminal 38 of one unit cell is electrically connected by a connection means (bus bar) 210 to the negative electrode current collection terminal 48 of the other unit cell. The battery pack 200 with the desired voltage is constructed by connecting the unit cells 100 in series in the above-described manner. Further, a plurality of unit cells 100 arranged in the predetermined direction as described hereinabove is disposed by reversing every other unit cell, so that the positive electrode current collection terminals 38 and negative electrode current collection terminals 48 of the unit cells are disposed alternately, and arranged in the direction in which the outer surfaces of the battery cases 10 face each other (flat surfaces of the electrode bodies 20 face each other).

Further, a cooling plate of a predetermined shape (not shown in the figure) may be disposed in a state of intimate contact with the wide surfaces of the battery cases 10 between the unit cells 100 arranged in a row. The cooling plate functions as a heat radiation member for causing efficient dissipation of heat generated inside the unit cells 100 in use. It is preferred that the cooling plate have a frame shape in which a cooling fluid (typically, the air) could be introduced between the unit cells 100.

As shown in FIG. 3, restraining members 230 that tighten together the plurality of unit cells 100 and spacer members 220 are disposed around the unit cells 100 and the spacer members 220 disposed in a row in the arrangement direction. Thus, a pair of restraining members 230 is disposed further on the outside of the unit cells 100 disposed on the outermost side in the unit cell arrangement direction. Fastening members 232 are attached so as to stretch between the pair of restraining members 230. By fastening the end portions of the fastening members 232 by screws 234 to the restraining members 230, it is possible to restrain the unit cells 100 and the spacer members 220 so that a predetermined restraining pressure P (the surface pressure applied to the wall surface of the battery case 10 is for example about 0.1 MPa to 10 MPa) is applied in the arrangement direction of the unit cells and spacer members. In the battery pack 200 restrained by such a restraining pressure P, a restraining pressure is also applied to the electrode body 20 located inside the case 10 of each unit cell 100, thereby preventing the displacement of the electrode body 20 and the distortion of the battery case and also preventing the decrease in battery performance.

When the abovementioned battery pack 200 is carried on a vehicle such as an automobile, a larger number of unit cells 100 can be connected in series, and also an external cover for protection of the main parts (unit cell groups) of the battery pack 200, parts for fixing the battery pack 200 to the predetermined location at the vehicle, and parts for connecting a plurality of battery packs to each other can be attached, but the presence (or absence) of such equipment does not affect the technical scope of the present invention.

Test examples (production examples) relating to the present invention will be described below, but the present invention is not intended to be limited to these specific examples.

In the test examples described hereinbelow, test lithium secondary batteries (sample batteries) were constructed by using the lithium-nickel-cobalt-manganese complex oxide disclosed herein as a positive electrode active material and the performance thereof was evaluated.

Test Example 1

Production of Lithium-Nickel-Cobalt-Manganese Complex Oxide

A nickel-cobalt-manganese complex hydroxide (for example, $Ni_{0.33}Co_{0.33}Mn_{0.33}(OH)_2$) including the constituent components (nickel, cobalt, manganese, and the Me element in Formula (1) above) that should be supplied as the nickel supply source, cobalt supply source, and manganese supply source, lithium carbonate ($Li_2CO_3$) was used as the lithium supply source, and the supply sources were mixed in amounts such that the molar ratio ($Li/M_{all}$) of Li and a total ($M_{all}$) of all other constituent metal elements had a predetermined value.

The abovementioned mixed starting source material was then pre-fired. In the pre-firing, the temperature was gradually raised from room temperature in the air and heating was performed for about 5 hours at a predetermined pre-firing temperature. The temperature was then further raised, and the pre-fired material obtained by pre-firing was fired by heating for about 20 hours at a predetermined maximum firing temperature. As a result of such a firing, a lithium-nickel-cobalt-manganese complex oxide powder with a lamellar structure was obtained that had lithium, nickel, cobalt, and manganese as the necessary constituent elements.

In the present test, lithium-nickel-cobalt-manganese complex oxides of Examples 1 to 15 were produced by the above-described method under conditions that differed in the molar ratio of constituent elements, presence of the element Me contained in a micro amount, molar ratio ($Li/M_{all}$), pre-firing temperature, and firing temperature. Further, lithium-nickel-cobalt-manganese complex oxides of Comparative Examples 1 to 4 were also produced without the pre-firing step. The production conditions of the lithium-nickel-cobalt-manganese complex oxides of Examples 1 to 15 and Comparative Examples 1 to 4 are shown in Table 1.

The average particle diameter (that is, median diameter (D50: μm) of secondary particles) of the produced lithium-nickel-cobalt-manganese complex oxides and the specific surface area (m$^2$/g) based on the BET method were measured. A Li occupancy based on the Rietveld analysis was calculated. Table 1 shows the measurement results relating to the lithium-nickel-cobalt-manganese complex oxides of Examples 1 to 15 and Comparative Examples 1 to 4.

Test Example 2

Measurement of Reaction Resistance Value (Rct)

Test lithium secondary batteries were constructed by using the lithium-nickel-cobalt-manganese complex oxide powder produced in the abovementioned Test Example 1 as respective positive electrode active materials. An AC impedance was measured for each of the test batteries and the reaction resistance (Ω) of those batteries was evaluated. The test lithium secondary batteries were constructed in the following manner.

First, a positive electrode of the test lithium secondary battery was prepared. Thus, when a positive electrode active material layer was formed on the positive electrode, a paste for forming the positive electrode active material layer was prepared by using the lithium-nickel-cobalt-manganese complex oxide as the positive electrode active material, polyvinylidene fluoride (PVdF) as a binder, and acetylene black as a conductive material, adding N-methylpyrrolidone (NMP) to obtain a ratio of 85:10:5 (wt %) of those materials, and mixing.

The abovementioned paste was then coated on an aluminum foil as a positive electrode collector, and the NMP contained in the paste was dried (evaporated). The coating was then spread into a sheet with a roller press and an active material layer was formed on the surface of the positive electrode collector. A positive electrode was prepared by punching to obtain the shape of a positive electrode for a 18650-type battery (diameter 18 mm, height 65 mm).

A negative electrode of the test lithium secondary battery was then prepared. The negative electrode was prepared by using a lithium metal foil and punching to obtain the shape of a negative electrode for a 18650-type battery.

The 300 mA test lithium secondary battery of a 18650 type was constructed by using the prepared positive electrode and negative electrode. Thus, the round positive electrode and a polypropylene separator impregnated with a nonaqueous electrolytic solution were laminated and disposed inside an outer case forming an outer section on the positive electrode side, the circumferential edge of the separator was pressed with a gasket constituted by polypropylene, and then the round negative electrode, a spacer for thickness adjustment, and a plate spring were disposed in the order of description on the separator. The test lithium secondary battery was then constructed by sealing the interior of the abovementioned filled outer case with an outer lid and sealing the circumferential edge portions of the outer case and outer lid.

The nonaqueous electrolytic solution used in the test had a composition obtained by dissolving $LiPF_6$ at 1 mol/L in a mixed solvent in which propylene carbonate (PC) and diethyl carbonate (DEC) were mixed at a ratio of 1:1 (volume ratio).

The AC impedance of the test lithium secondary battery constructed in the above-described manner was measured, and a reaction resistance (Rct; Ω) was calculated from a Cole-Cole plot (not shown in the figure) of the obtained impedance. The AC impedance was measured under the following conditions: applied AC voltage 5 mV, frequency range 100000 μHz to 0.001 MHz. Table 1 shows the reaction resistance values of the lithium secondary batteries constructed by using the lithium-nickel-cobalt-manganese complex oxides of Examples 1 to 15 and Comparative Examples 1 to 4 as positive electrode active materials.

TABLE 1

| | Molar ratio Ni/Co/Mn | Added element Me | $Li/M_{all}$ | Pre-firing temperature (° C.) | Firing temperature (° C.) | D50 (μm) | BET ($m^2/g$) | Li site occupation ratio (%) | Reaction resistance (Ω) |
|---|---|---|---|---|---|---|---|---|---|
| Example 1 | 33/33/33 | — | 1.15 | 730 | 950 | 6.5 | 0.56 | 99.2 | 2.0 |
| Example 2 | | Zr | 1.15 | 730 | 950 | 4.2 | 0.91 | 99.0 | 1.9 |
| Example 3 | | Nb | 1.12 | 730 | 950 | 5.6 | 0.77 | 99.0 | 1.8 |
| Example 4 | | W | 1.14 | 730 | 950 | 5.5 | 0.83 | 99.0 | 1.7 |
| Example 5 | | Ta | 1.13 | 730 | 950 | 5.9 | 0.81 | 98.9 | 2.0 |
| Example 6 | | Mo | 1.11 | 730 | 950 | 5.1 | 0.84 | 99.0 | 1.75 |
| Example 7 | 40/30/30 | — | 1.15 | 730 | 930 | 5.8 | 0.92 | 99.1 | 1.9 |
| Example 8 | 50/20/30 | — | 1.13 | 760 | 870 | 5.9 | 0.81 | 98.5 | 2.1 |
| Example 9 | | Zr | 1.14 | 760 | 870 | 6.1 | 0.83 | 98.6 | 1.9 |
| Example 10 | | Nb | 1.13 | 760 | 870 | 6.1 | 0.81 | 98.4 | 1.9 |
| Example 11 | | W | 1.11 | 760 | 870 | 6.3 | 0.78 | 98.5 | 1.7 |
| Example 12 | 50/25/25 | — | 1.10 | 760 | 870 | 5.9 | 0.80 | 98.8 | 1.7 |
| Example 13 | | Zr | 1.10 | 760 | 870 | 6.0 | 0.79 | 98.9 | 1.6 |
| Example 14 | 50/30/20 | — | 1.11 | 760 | 870 | 6.8 | 0.72 | 99.0 | 1.9 |
| Example 15 | 60/20/20 | — | 1.08 | 760 | 830 | 6.6 | 0.66 | 99.0 | 1.4 |
| Comparative Example 1 | 33/33/33 | — | 1.15 | — | 950 | 6.4 | 0.57 | 98.0 | 2.5 |
| Comparative Example 2 | 50/20/30 | — | 1.13 | — | 870 | 6.1 | 0.79 | 96..0 | 3.5 |
| Comparative Example 3 | 50/25/25 | — | 1.10 | — | 870 | 5.7 | 0.88 | 96.2 | 3.4 |
| Comparative Example 4 | 60/20/20 | — | 1.08 | — | 830 | 6.4 | 0.63 | 96.3 | 3.2 |

As shown in Table 1, the lithium-nickel-cobalt-manganese complex oxides (Examples 1 to 15) produced by pre-firing in a predetermined temperature range (730 to 830° C.) had a high lithium occupancy with all of the numerical values of lithium occupancy being greater than 96.5%. Meanwhile, the lithium-nickel-cobalt-manganese complex oxides (Comparative Examples 1 to 4) produced without the pre-firing step had a low lithium occupancy.

As for the measurement results of reaction resistance values, the highest reaction resistance value of lithium secondary batteries constructed by using the pre-fired lithium-nickel-cobalt-manganese complex oxides (Examples 1 to 15) as respective positive electrode active materials was 2.1 mΩ (Example 8) and all of the reaction resistance values were small. Therefore, the increase in the resistance was inhibited. Meanwhile, the reaction resistance value of lithium secondary batteries constructed by using the lithium-nickel-cobalt-manganese complex oxides obtained without pre-firing (Comparative Examples 1 to 4) as respective positive electrode active materials was larger in all of the comparative examples than 2.1 mΩ of Example 8.

Further, the following test was conducted to evaluate the preferred range of pre-firing temperature.

Lithium-nickel-cobalt-manganese complex oxides $Li_{1.15}Ni_{0.33}Co_{0.33}Mn_{0.34}O_2$ and $Li_{1.10}Ni_{0.50}Co_{0.25}Mn_{0.25}O_2$ were produced by the same technique as in Test Example 1. However, the lithium-nickel-cobalt-manganese complex oxides were produced under conditions relating to the following two cases: the case in which the pre-firing temperature was set to 700° C. and the case in which the pre-firing temperature was set to 750° C. The Li occupancy based on the Rietveld analysis was calculated in each case.

Then, test lithium secondary batteries were constructed by the technique same as in Test Example 2 by using the produced lithium-nickel-cobalt-manganese complex oxides and the reaction resistance (Ω) was determined for each lithium secondary battery.

Figure 4:
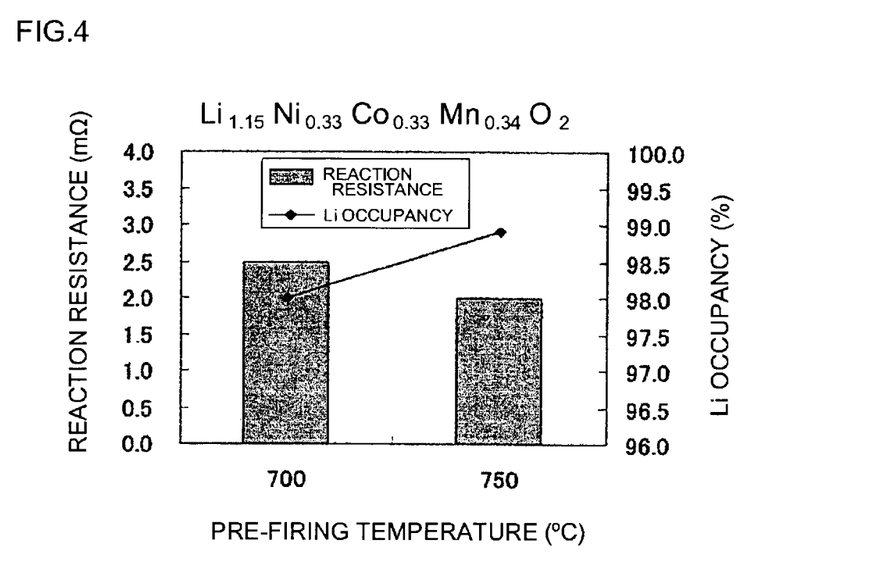
FIG. 4 is a graph illustrating the Li occupancy and reaction resistance of a lithium-nickel-cobalt-manganese complex oxide $Li_{1.15}Ni_{0.33}Co_{0.33}Mn_{0.34}O_2$ produced in steps with different pre-firing temperature.
Figure 5:
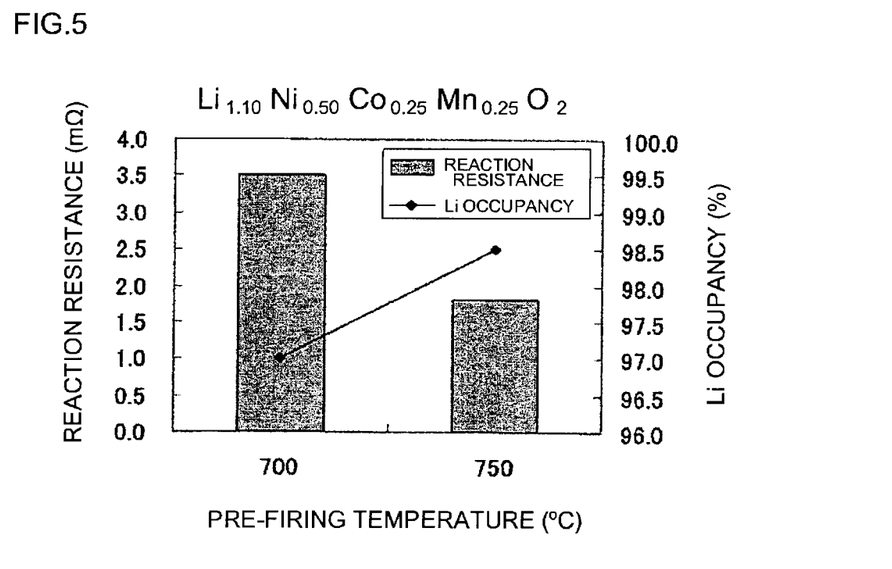
FIG. 5 is a graph illustrating the Li occupancy and reaction resistance of a lithium-nickel-cobalt-manganese complex oxide $Li_{1.10}Ni_{0.50}Co_{0.25}Mn_{0.25}O_2$ produced in steps with different pre-firing temperature.

FIG. 4 shows graphs illustrating the Li occupancy and reaction resistance of $Li_{1.15}Ni_{0.33}Co_{0.33}Mn_{0.34}O_2$. FIG. 5 shows graphs illustrating the Li occupancy and reaction resistance of $Li_{1.10}Ni_{0.50}Co_{0.25}Mn_{0.25}O_2$.

As clearly follows from FIG. 4 and FIG. 5, where the case in which the pre-firing temperature was set to 700° C. and the case in which the pre-firing temperature was set to 750° C. are compared, it was confirmed that the Li occupancy of the lithium-nickel-cobalt-manganese complex oxide was higher and the reaction resistance was lower in the case in which the pre-firing temperature was set to 750° C.

The present invention is explained above by the preferred embodiments thereof, but this description is not limiting and it goes without saying that various modifications can be made. For example, the battery type is not limited to the above-described lithium secondary battery, and batteries of various contents that differ in the electrode body constituent materials or electrolytes may be used. The battery size or other features can be also adequately changed according to application (typically, for a vehicle).

INDUSTRIAL APPLICABILITY

Figure 6:
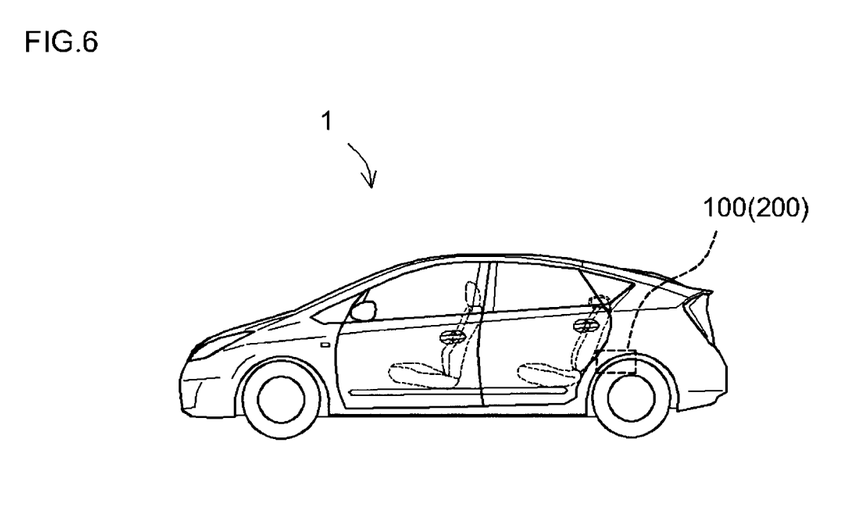
FIG. 6 is a side view showing schematically a vehicle (automobile) equipped with a lithium secondary battery according to one embodiment.

As described hereinabove, the lithium-nickel-cobalt-manganese complex oxide obtained by the method in accordance with the present invention is a positive electrode active material with excellent conductivity that has a high Li occupancy of Li sites in the crystal determined by the Rietveld analysis and a high-density lamellar crystal structure. Therefore, the lithium secondary battery constructed by using the lithium-nickel-cobalt-manganese complex oxide obtained by the production method in accordance with the present invention has excellent battery characteristics (battery capacity, cycle characteristic, or high-rate characteristic) and such a battery can be advantageously used as a power supply for a motor (electric motor) carried on a vehicle such as an automobile. Therefore, the present invention provides a vehicle 1 (typically, an automobile, in particular, an automobile provided with an electric motor such as a hybrid automobile, an electric automobile, and a fuel cell automobile) that is provided with such lithium secondary battery 100 (typically, the battery pack 200 in which a plurality of such lithium secondary batteries is connected in series), as shown schematically in FIG. 6.

The invention claimed is:

1. A method for producing a positive electrode active material for a lithium secondary battery constituted by a lithium-nickel-cobalt-manganese complex oxide with a lamellar structure having lithium, nickel, cobalt, and manganese as essential constituent elements, the method comprising:
preparing a starting source material for producing a complex oxide represented by the following formula:

$$Li_{1+x}Ni_aCo_bMn_cMe_dO_2 \qquad (1)$$

where, x, a, b, c, and d are numbers satisfying all of the following conditions:
$0.05 \leq x \leq 0.2$,
$0.3 \leq a \leq 0.6$,
$0.1 \leq b \leq 0.6$,
$0.1 \leq c \leq 0.5$,
$0 \leq d \leq 0.02$,
a+b+c+d=1, and
Me is one or two or more element selected from the group consisting of V, Nb, Ta, Mo, and W,
wherein the starting source material comprises a nickel-cobalt-manganese complex hydroxide including Ni, Co, Mn and the Me element in the formula (1) and a lithium supply source, and
the starting source material is prepared such that a molar ratio ($Li/M_{all}$) of lithium (Li) and a total ($M_{all}$) of all other constituent metal elements is $1.11 \leq Li/M_{all} \leq 1.2$;
pre-firing the starting source material by heating at a pre-firing temperature that has been set to a temperature lower than 800° C. and higher than a melting temperature of the lithium supply source; and
firing the pre-fired material obtained in the pre-firing step by raising a temperature to a temperature range higher than the pre-firing temperature.

2. The production method according to claim 1, wherein the starting source material is prepared such that a molar ratio ($Li/M_{all}$) of lithium (Li) and a total ($M_{all}$) of all other constituent metal elements is $1.11 < Li/M_{all} \leq 1.15$.

3. The production method according to claim 1, wherein lithium carbonate or lithium hydroxide is used as the lithium supply source.

4. The production method according to claim 1, wherein the starting source material is pre-fired at a pre-firing temperature that is set within a temperature range from a temperature equal to or higher than 710° C. to a temperature lower than 800° C. in air or an oxidizing atmosphere and then fired by raising the temperature to a maximum firing temperature that is set within a temperature range from 800° C. to 1000° C.

* * * * *